United States Patent [19]

Spinosa

[11] Patent Number: 4,993,176
[45] Date of Patent: Feb. 19, 1991

[54] CHRISTMAS TREE STAND WATERING SYSTEM

[76] Inventor: Vincent D. Spinosa, 284 Hovendon Ave., Brockton, Mass. 02402

[21] Appl. No.: 428,340

[22] Filed: Oct. 27, 1989

[51] Int. Cl.⁵ ............................................. A47G 7/02
[52] U.S. Cl. ......................................... 40/40.5; 47/79
[58] Field of Search ........................... 47/40.5, 79, 48.5

[56] References Cited

U.S. PATENT DOCUMENTS

| | | | |
|---|---|---|---|
| 2,938,304 | 5/1960 | Thomas | 47/40.5 |
| 3,697,026 | 10/1972 | Hambrick | 47/40.5 |
| 4,653,224 | 3/1987 | Weckesser | 47/40.5 |
| 4,930,252 | 6/1990 | Kranse | 47/40.5 |

FOREIGN PATENT DOCUMENTS 1473290 2/1967 France .................................... 47/79

OTHER PUBLICATIONS

Popular Science Dec. 1978, p. 140.

Primary Examiner—Henry E. Raduazo

[57] ABSTRACT

This is a watering system for a stand for a botanical specimen. The watering system includes an ornamental reservoir from which a water hose and an air hose extend. The hoses have terminal ends which are positioned in the container of the stand. The container is filled with water and the terminal ends are cut on a bias. As the water in the container is depleted, the biased terminal end of the air hose is opened to the atmosphere causing water to flow from the reservoir to the container through the water hose. The watering system could also use a single hose of greater diameter than either of the hoses of the first embodiment. The terminal end of the hose is positioned in the container and is cut on a bias. As the water in the container is depleted, the biased terminal end of the hose is opened to the atmosphere causing water to flow from the reservoir to the container through the bottom half of the hose.

4 Claims, 2 Drawing Sheets

CHRISTMAS TREE STAND WATERING SYSTEM

BACKGROUND OF THE INVENTION

This invention relates generally to a stand for a botanical specimen and more specifically to a water system for a stand for a botanical specimen.

SUMMARY OF THE INVENTION

The invention disclosed herein is a water system for a stand for a botanical specimen comprising a reservoir, a water hose, an air hose and a plant container, the water hose having a first terminal end and a second terminal end, the first terminal end extending into the reservoirs, the second terminal end extending into the plant container, the air hose having a first end and a second end, the first end extending into the reservoir, the second end extending into the plant container, whereby with water in the reservoir and in the plant container covering the first end and the first and second terminal ends and the second end above the water, water will flow from the reservoir to the plant container.

BRIEF DESCRIPTION OF THE DRAWINGS

Further details are explained below with the help of the example(s) illustrated in the attached drawings in which.

DESCRIPTION OF THE PREFERRED EMBODIMENT(S)

Figure 1:
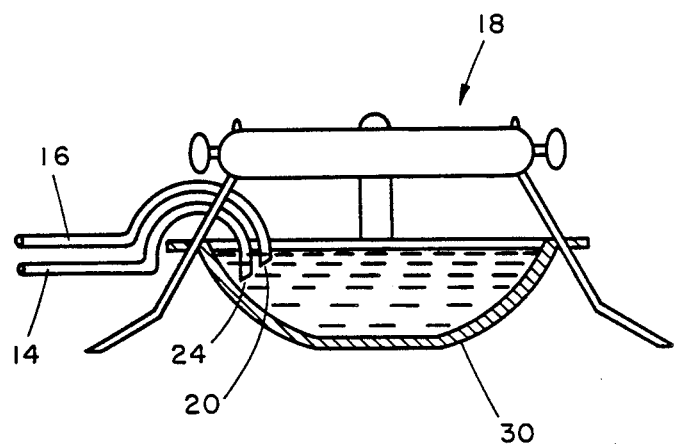
FIG. 1 is a side elevational view partly in section showing the stand for a botanical specimen with the terminal end of the air hose under water according to the present invention.
Figure 2:
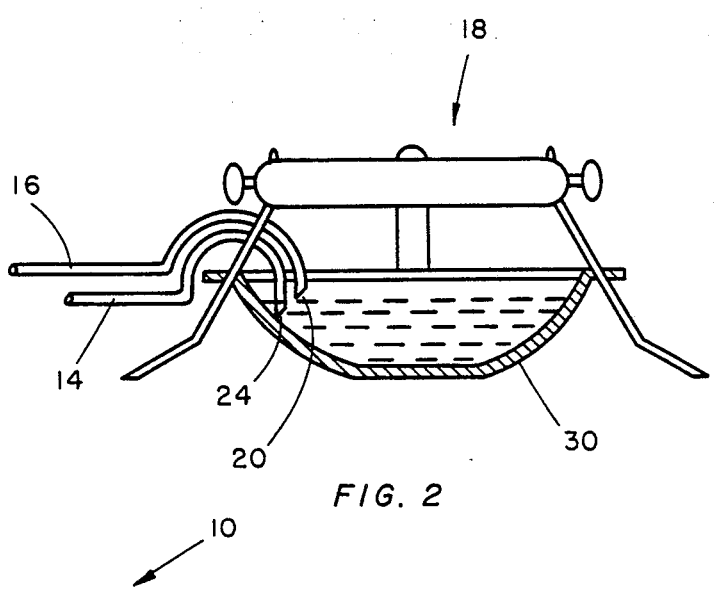
FIG. 2 is a side elevational view partly in section showing the stand for a botanical specimen shown in FIG. 1 with the terminal end of the air hose above water according to the present invention.
Figure 3:
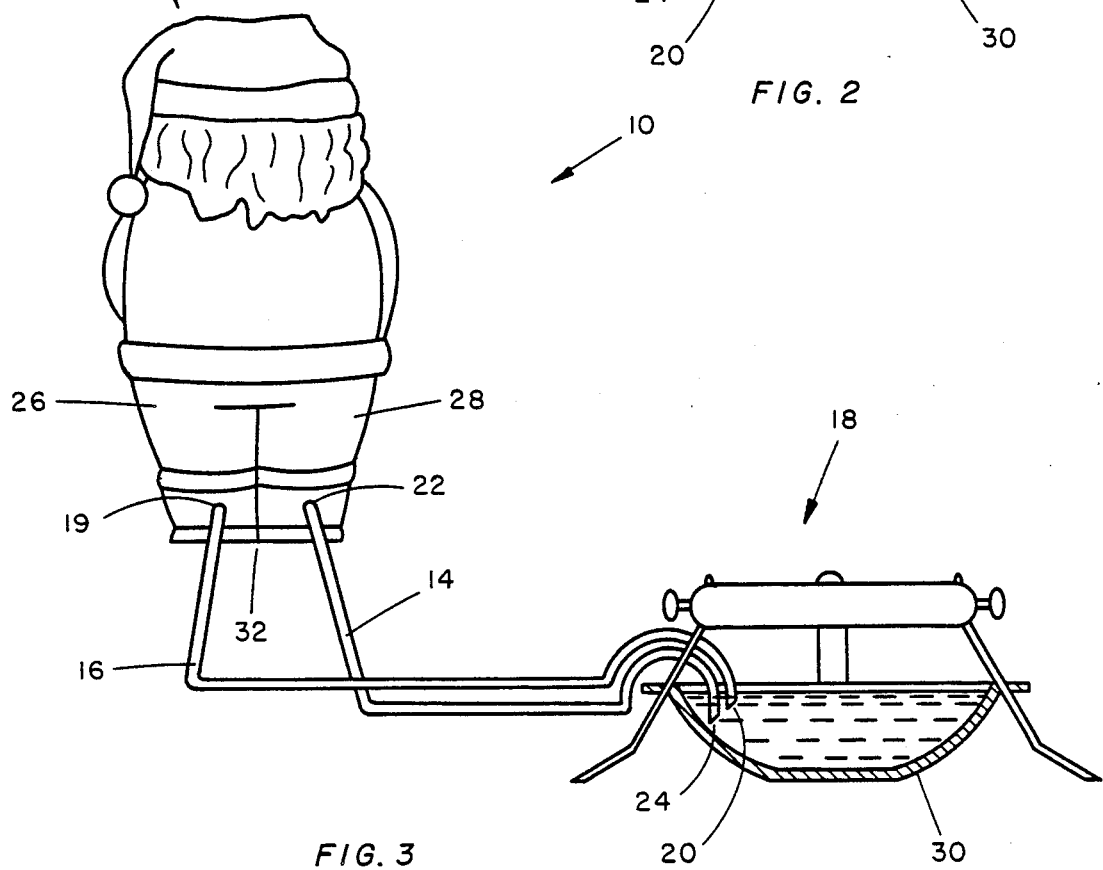
FIG. 3 is a side elevational view partly in section showing the water system and the stand for a botanical specimen shown in according to the present invention.

Shown in the drawings is a water system 10 for a botanical specimen comprising a reservoir 12, a water hose 14, an air hose 16 and a christmas tree stand 18. The hoses 14, 16 may be made of a flexible plastic material and have an ID of ⅜". The air hose 16 has a terminal end 19 and a free terminal end 20. The free terminal end 20 is cut on a bias to assure air flow. The water hose 14 has a first terminal end 22 and a second terminal end 24. The reservoir 12 is in the form of a hollow decorative piece such as a Santa Claus formed of a rigid plastic material such as WHAT?. The reservoir 12 is approximately 21 inches high and includes a first aperture 26 and a second aperture 28 formed through a lower back wall thereof.

The christmas tree stand 18 is formed of a metal steel for example, and may have three legs which engage a ring and are in spaced relation to each other. The free ends of the legs support a second ring which has a series of three adjustable screws that are positioned equally spaced around the second ring. The screws may be threaded into the second ring to hold a christmas tree trunk which is positioned coaxially within the second ring. An hemispherical, dish like container 30 is mounted below the ring and in which the terminal end of the christmas tree trunk rests. The christams tree stand 18 is approximately 10 inches high.

Assembly of the water system 10 is accomplished by mounting the reservoir 12 on a stand 32. The stand 32 is about 12 inches high. The first terminal end 22 of the water hose 14 and the terminal end 19 of the air hose 16 extend into the reservoir 12 through the first and second apertures 26, 28 respectively. The second terminal end 24 and the free terminal end 20 extend into the container 30 of the christmas tree stand 18. Water fills the reservoir 12 HOW? and the container 30. The free terminal end 20 of the air hose 16 and the second terminal end 24 of the water hose 14 are covered by the water in the container 30. As the water in the container 30 evaporates it uncovers the free terminal end 20 of the air hose 16 which causes water to flow through the water hose 14 refilling the container 30. When the free terminal end 20 is again covered by water, the flow will stop until the cycle is repeated.

Figure 4:
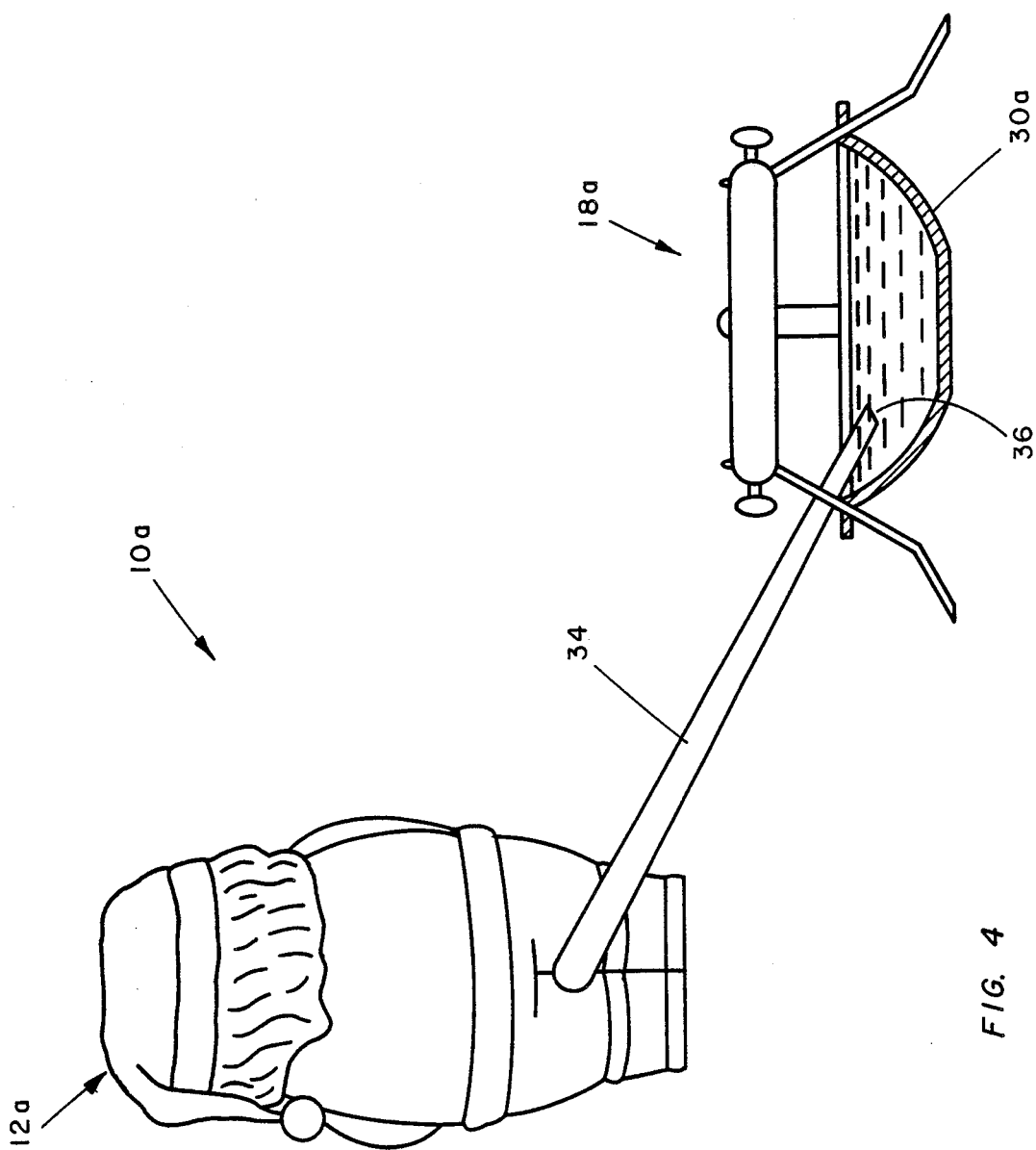
FIG. 4 is a side elevational view partly in section showing the water system and the stand for a botanical specimen utilizing a single hose according to the present invention.

A variation 10a of the water system is shown in FIG. 4. The variation 10a utilizes a single hose 34 which extends from the reservoir 12a to the container 30a of the christmas tree stand 18a. The single hose 34 has an ID of 0.75 inches so that as that water in the container 30a evaporates it uncovers a portion of the end 36, which is cut on a bias, allowing air to enter. This causes water to flow through the lower portion of the single hose 34 refilling the container 30a. When the end 36 is again covered by water, the flow will stop until the cycle is repeated.

What I claim is:

1. A water system for a stand for a botanical specimen comprising a reservoir, a water hose, an air hose and a plant container, the water hose having a first terminal end and a second terminal end, the first terminal end extending into the reservoir, the second terminal end extending into the plant container, the air hose having a first end and a second end, the first end extending into the reservoir, the second and extending into the plant container, whereby with water in the reservoir and in the plant container covering the first end and the first and second terminal ends and the second end above the water, water will flow from the reservoir to the plant container.

2. A water system for a stand for a botanical specimen as set forth in claim 1 wherein the reservoir has a form, the form being decorative.

3. A water system for a stand for a botanical specimen as set forth in claim 1 wherein the reservoir has a form, the form having the configuration of Santa Clause.

4. A water system for a stand for a botanical specimen as set forth in claim 1 wherein the plant container is a live christmas tree container.

* * * * *